United States Patent
Rajan et al.

(10) Patent No.: US 10,152,511 B2
(45) Date of Patent: Dec. 11, 2018

(54) TECHNIQUES FOR OPTIMIZATION OF INNER QUERIES

(71) Applicant: salesforce.com, inc., San Francisco, CA (US)

(72) Inventors: Chirag Rajan, San Francisco, CA (US); Jesse Collins, Berkeley, CA (US); Jaikumar Bathija, Fremont, CA (US); Hoon Kim, Redwood City, CA (US)

(73) Assignee: salesforce.com, inc., San Francisco, CA (US)

( * ) Notice: Subject to any disclaimer, the term of this patent is extended or adjusted under 35 U.S.C. 154(b) by 379 days.

(21) Appl. No.: 14/028,316

(22) Filed: Sep. 16, 2013

(65) Prior Publication Data
US 2014/0081950 A1    Mar. 20, 2014

Related U.S. Application Data

(60) Provisional application No. 61/701,500, filed on Sep. 14, 2012.

(51) Int. Cl.
*G06F 17/30*    (2006.01)

(52) U.S. Cl.
CPC .. *G06F 17/30474* (2013.01); *G06F 17/30498* (2013.01)

(58) Field of Classification Search
CPC ......... G06F 17/30864; G06F 17/30466; G06F 17/30457; G06F 17/30896; G06F 17/30474; G06F 17/30498
USPC ...................................................... 707/715
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |

(Continued)

OTHER PUBLICATIONS

Final Office Action for U.S. Appl. No. 12/897,276 dated Apr. 1, 2015, 12 pages.

(Continued)

*Primary Examiner* — Hosain Alam
*Assistant Examiner* — Saba Ahmed
(74) *Attorney, Agent, or Firm* — Jaffery, Watson, Mendonsa & Hamilton, LLC (57) ABSTRACT

In an on demand database system, a query engine applies a custom index for inner queries. The query engine receives a query and determines that the query has an inner query nested within the primary query. The query engine identifies that a custom index exists for a client associated with the query, and applies the custom index to filter results for the query. The custom index includes a subset of information of a table that includes accounts for multiple different clients. By using the custom index, the query engine can filter the results more efficiently that if solely using the multiple client table.

17 Claims, 6 Drawing Sheets

(56) References Cited

U.S. PATENT DOCUMENTS

| | | | |
|---|---|---|---|
| 6,092,083 | A | 7/2000 | Brodersen et al. |
| 6,169,534 | B1 | 1/2001 | Raffel et al. |
| 6,178,425 | B1 | 1/2001 | Brodersen et al. |
| 6,189,011 | B1 | 2/2001 | Lim et al. |
| 6,216,135 | B1 | 4/2001 | Brodersen et al. |
| 6,233,617 | B1 | 5/2001 | Rothwein et al. |
| 6,266,669 | B1 | 7/2001 | Brodersen et al. |
| 6,295,530 | B1 | 9/2001 | Ritchie et al. |
| 6,324,568 | B1 | 11/2001 | Diec |
| 6,324,693 | B1 | 11/2001 | Brodersen et al. |
| 6,336,137 | B1 | 1/2002 | Lee et al. |
| D454,139 | S | 3/2002 | Feldcamp |
| 6,367,077 | B1 | 4/2002 | Brodersen et al. |
| 6,393,605 | B1 | 5/2002 | Loomans |
| 6,405,220 | B1 | 6/2002 | Brodersen et al. |
| 6,434,550 | B1 | 8/2002 | Warner et al. |
| 6,446,089 | B1 | 9/2002 | Brodersen et al. |
| 6,535,909 | B1 | 3/2003 | Rust |
| 6,549,908 | B1 | 4/2003 | Loomans |
| 6,553,563 | B2 | 4/2003 | Ambrose et al. |
| 6,560,461 | B1 | 5/2003 | Fomukong et al. |
| 6,574,635 | B2 | 6/2003 | Stauber et al. |
| 6,577,726 | B1 | 6/2003 | Huang et al. |
| 6,601,087 | B1 | 7/2003 | Zhu et al. |
| 6,604,117 | B2 | 8/2003 | Lim et al. |
| 6,604,128 | B2 | 8/2003 | Diec |
| 6,609,150 | B2 | 8/2003 | Lee et al. |
| 6,621,834 | B1 | 9/2003 | Scherpbier et al. |
| 6,654,032 | B1 | 11/2003 | Zhu et al. |
| 6,665,648 | B2 | 12/2003 | Brodersen et al. |
| 6,665,655 | B1 | 12/2003 | Warner et al. |
| 6,684,438 | B2 | 2/2004 | Brodersen et al. |
| 6,711,565 | B1 | 3/2004 | Subramaniam et al. |
| 6,724,399 | B1 | 4/2004 | Katchour et al. |
| 6,728,702 | B1 | 4/2004 | Subramaniam et al. |
| 6,728,960 | B1 | 4/2004 | Loomans |
| 6,732,095 | B1 | 5/2004 | Warshavsky et al. |
| 6,732,100 | B1 | 5/2004 | Brodersen et al. |
| 6,732,111 | B2 | 5/2004 | Brodersen et al. |
| 6,754,681 | B2 | 6/2004 | Brodersen et al. |
| 6,763,351 | B1 | 7/2004 | Subramaniam et al. |
| 6,763,501 | B1 | 7/2004 | Zhu et al. |
| 6,768,904 | B2 | 7/2004 | Kim |
| 6,782,383 | B2 | 8/2004 | Subramaniam et al. |
| 6,804,330 | B1 | 10/2004 | Jones et al. |
| 6,826,565 | B2 | 11/2004 | Ritchie et al. |
| 6,826,582 | B1 | 11/2004 | Chatterjee et al. |
| 6,826,745 | B2 | 11/2004 | Coker et al. |
| 6,829,655 | B1 | 12/2004 | Huang et al. |
| 6,842,748 | B1 | 1/2005 | Warner et al. |
| 6,850,895 | B2 | 2/2005 | Brodersen et al. |
| 6,850,949 | B2 | 2/2005 | Warner et al. |
| 7,340,411 | B2 | 3/2008 | Cook |
| 7,620,655 | B2 | 11/2009 | Larsson et al. |
| 8,359,325 | B1* | 1/2013 | Gui .................. G06F 17/30896 707/760 |
| 8,396,860 | B1* | 3/2013 | Ramesh et al. ............... 707/713 |
| 8,768,959 | B1* | 7/2014 | Annapragada et al. ...... 707/770 |
| 9,146,984 | B1* | 9/2015 | Bozkaya ............ G06F 17/3066 |
| 9,336,272 | B1* | 5/2016 | Thombre .......... G06F 17/30442 |
| 2001/0044791 | A1 | 11/2001 | Richter et al. |
| 2002/0022986 | A1 | 2/2002 | Coker et al. |
| 2002/0029161 | A1 | 3/2002 | Brodersen et al. |
| 2002/0029376 | A1 | 3/2002 | Ambrose et al. |
| 2002/0035577 | A1 | 3/2002 | Brodersen et al. |
| 2002/0042264 | A1 | 4/2002 | Kim |
| 2002/0042843 | A1 | 4/2002 | Diec |
| 2002/0072951 | A1 | 6/2002 | Lee et al. |
| 2002/0078015 | A1* | 6/2002 | Ponnekanti ....... G06F 17/30466 |
| 2002/0082892 | A1 | 6/2002 | Raffel et al. |
| 2002/0129352 | A1 | 9/2002 | Brodersen et al. |
| 2002/0140731 | A1 | 10/2002 | Subramaniam et al. |
| 2002/0143997 | A1 | 10/2002 | Huang et al. |
| 2002/0152102 | A1 | 10/2002 | Brodersen et al. |
| 2002/0161734 | A1 | 10/2002 | Stauber et al. |
| 2002/0162090 | A1 | 10/2002 | Parnell et al. |
| 2002/0165742 | A1 | 11/2002 | Robins |
| 2003/0004971 | A1 | 1/2003 | Gong et al. |
| 2003/0018705 | A1 | 1/2003 | Chen et al. |
| 2003/0018830 | A1 | 1/2003 | Chen et al. |
| 2003/0061244 | A1* | 3/2003 | Hirohata .......... G06F 17/30463 |
| 2003/0066031 | A1 | 4/2003 | Laane |
| 2003/0066032 | A1 | 4/2003 | Ramachadran et al. |
| 2003/0069936 | A1 | 4/2003 | Warner et al. |
| 2003/0070000 | A1 | 4/2003 | Coker et al. |
| 2003/0070004 | A1 | 4/2003 | Mukundan et al. |
| 2003/0070005 | A1 | 4/2003 | Mukundan et al. |
| 2003/0074418 | A1 | 4/2003 | Coker |
| 2003/0088545 | A1 | 5/2003 | Subramaniam et al. |
| 2003/0120675 | A1 | 6/2003 | Stauber et al. |
| 2003/0151633 | A1 | 8/2003 | George et al. |
| 2003/0159136 | A1 | 8/2003 | Huang et al. |
| 2003/0187921 | A1 | 10/2003 | Diec |
| 2003/0189600 | A1 | 10/2003 | Gune et al. |
| 2003/0191743 | A1 | 10/2003 | Brodersen et al. |
| 2003/0204427 | A1 | 10/2003 | Gune et al. |
| 2003/0206192 | A1 | 11/2003 | Chen et al. |
| 2003/0225730 | A1 | 12/2003 | Warner et al. |
| 2004/0001092 | A1 | 1/2004 | Rothwein et al. |
| 2004/0010489 | A1 | 1/2004 | Rio |
| 2004/0015981 | A1 | 1/2004 | Coker et al. |
| 2004/0027388 | A1 | 2/2004 | Berg et al. |
| 2004/0128001 | A1 | 7/2004 | Levin et al. |
| 2004/0186860 | A1 | 9/2004 | Lee et al. |
| 2004/0193510 | A1 | 9/2004 | Catahan, Jr. et al. |
| 2004/0199489 | A1 | 10/2004 | Barnes-Leon et al. |
| 2004/0199536 | A1 | 10/2004 | Barnes-Leon et al. |
| 2004/0199543 | A1 | 10/2004 | Braud et al. |
| 2004/0249854 | A1 | 12/2004 | Barnes-Leon et al. |
| 2004/0260534 | A1 | 12/2004 | Pak et al. |
| 2004/0260659 | A1 | 12/2004 | Chan et al. |
| 2004/0268299 | A1 | 12/2004 | Lei et al. |
| 2005/0050555 | A1 | 3/2005 | Exley et al. |
| 2005/0091098 | A1 | 4/2005 | Brodersen et al. |
| 2005/0223022 | A1 | 10/2005 | Weissman et al. |
| 2006/0023945 | A1* | 2/2006 | King et al. .................... 382/173 |
| 2006/0136368 | A1* | 6/2006 | Young-Lai et al. .............. 707/2 |
| 2006/0167865 | A1* | 7/2006 | Andrei .............. G06F 17/30466 |
| 2006/0235831 | A1 | 10/2006 | Adinolfi et al. |
| 2007/0027860 | A1* | 2/2007 | Bestgen et al. .................... 707/5 |
| 2007/0226186 | A1* | 9/2007 | Ewen ................ G06F 17/30463 |
| 2007/0271268 | A1 | 11/2007 | Fontoura et al. |
| 2009/0019001 | A1* | 1/2009 | Thiyagarajan .... G06F 17/30457 |
| 2009/0070313 | A1* | 3/2009 | Beyer ............... G06F 17/30386 |
| 2009/0282045 | A1 | 11/2009 | Hsieh et al. |
| 2010/0005054 | A1* | 1/2010 | Smith et al. ....................... 707/2 |
| 2010/0088311 | A1* | 4/2010 | Du Fosse et al. ............. 707/722 |
| 2010/0169354 | A1 | 7/2010 | Baby et al. |
| 2011/0010394 | A1 | 1/2011 | Carew et al. |
| 2011/0082854 | A1* | 4/2011 | Eidson .............. G06F 17/30463 707/714 |
| 2011/0289091 | A1* | 11/2011 | Collins .................. G06Q 10/10 707/741 |
| 2013/0124500 | A1* | 5/2013 | Beavin et al. ................. 707/714 |
| 2013/0173590 | A1* | 7/2013 | Ghazal ............. G06F 17/30483 707/714 |
| 2013/0232133 | A1* | 9/2013 | Al-Omari ......... G06F 17/30498 707/714 |
| 2015/0112965 | A1* | 4/2015 | Tokuda ............. G06F 17/30483 707/718 |

OTHER PUBLICATIONS

Final Office Action for U.S. Appl. No. 12/897,276 dated Aug. 8, 2012, 11 pages.

Final Office Action for U.S. Appl. No. 12/897,276 dated Jul. 15, 2016, 9 pages.

Non-Final Office Action for U.S. Appl. No. 12/897,276 dated Dec. 18, 2013, 8 pages.

Non-Final Office Action for U.S. Appl. No. 12/897,276 dated Feb. 21, 2012, 8 pages.

Non-Final Office Action for U.S. Appl. No. 12/897,276 dated Jul. 7, 2017, 15 pages.

(56) References Cited

OTHER PUBLICATIONS

Non-Final Office Action for U.S. Appl. No. 12/897,276 dated May 22, 2014, 8 pages.
Non-Final Office Action for U.S. Appl. No. 12/897,276 dated Nov. 30, 2016, 8 pages.
Non-Final Office Action for U.S. Appl. No. 12/897,276 dated Nov. 6, 2015, 10 pages.
Non-Final Office Action for U.S. Appl. No. 12/897,276 dated Sep. 10, 2014, 8 pages.
Final Office Action for U.S. Appl. No. 12/897,276 dated Jun. 25, 2018, 16 pages.
Non-Final Office Action for U.S. Appl. No. 12/897,276 dated Jan. 23, 2018, 17 pages.

* cited by examiner

TECHNIQUES FOR OPTIMIZATION OF INNER QUERIES

RELATED CASES

This application is a nonprovisional application based on U.S. Provisional Patent Application No. 61/701,500, filed Sep. 14, 2012, and claims the benefit of priority of that provisional application. Provisional Application No. 61/701,500 is hereby incorporated by reference.

FIELD

Embodiments described are related generally to database queries, and embodiments described are more particularly related to providing query optimizations for database queries.

COPYRIGHT NOTICE/PERMISSION

Portions of the disclosure of this patent document may contain material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright © 2013, Salesforce.com Inc., All Rights Reserved.

BACKGROUND

In a database system, a client makes queries to obtain data stored in the database system. When a database system has a large amount of data, being able to search all the data to process the query can be resource intensive, as well as time consuming. For a database system that stores data for multiple different clients, the size of the system tends to increase significantly, which puts a greater load on the processing resources of the database system, and increases the amount of time required to generate results for a query. Thus, while there can be many advantages to having a unified database system which stores a large amount of data, accessing the data can be inefficient. Client queries can create an undesired burden on the system, and/or take an undesired amount of time to process.

BRIEF DESCRIPTION OF THE DRAWINGS

The following description includes discussion of figures having illustrations given by way of example of implementations of embodiments described. The drawings should be understood by way of example, and not by way of limitation. As used herein, references to one or more "embodiments" are to be understood as describing a particular feature, structure, or characteristic included in at least one implementation. Thus, phrases such as "in one embodiment" or "in an alternate embodiment" appearing herein describe various embodiments and implementations, and do not necessarily all refer to the same embodiment. However, they are also not necessarily mutually exclusive.

Descriptions of certain details and implementations follow, including a description of the figures, which may depict some or all of the embodiments described below, as well as discussing other potential embodiments or implementations of the inventive concepts presented herein. An overview is provided below, followed by a more detailed description with reference to the drawings.

DETAILED DESCRIPTION

As described herein, a database system includes multiple custom indexes to reduce the amount of data the database system needs to process to generate results for a query. However, even when such custom indexes exist, a unified database system may still fail to utilize the custom indexes when processing a query. For example, where a client submits a query that has nested query elements, which can also be referred to as nested queries, inner queries, and/or subqueries, the database system may ignore the custom indexes. A database system may lose context of the query when parsing the query into subqueries, and thus not query optimizations available for processing the query. It will be understood that reference to an "optimization" refers to any mechanism or technique that improves performance, and does not necessarily mean that an absolute optimum solution is provided by use of the optimization. As described herein, a query engine, which processes a client query, identifies custom indexes associated with a query, and applies the custom indexes when processing the query.

In general, a query engine can treat an inner query or a nested query as an independent query. The query received from the client can be considered a top level query or an outer query, and typically a full set of optimization options are available for processing the query (e.g., via a query optimizer). However, when the client query is parsed into nested queries, the optimizations available for the client query are not typically available for the nested queries. As described herein, the query engine treats nested queries as independent queries, which allows the query engine and query optimizers to apply optimization techniques to the nested queries. Thus, for example, a query engine can perform any one or more of the following when processing a nested or inner query: apply custom indexes to the inner query; apply other applicable database indexes to the inner query; apply any sort of available database query optimizations; join the results of the inner query to the main query; or, a combination of these.

In an on demand database system, the on demand database system is a unified system that stores data for multiple different clients. The on demand database system includes a query engine that applies a custom index for inner queries. The query engine receives a query and determines that the query has an inner query nested within the primary query. The query engine identifies one or more optimization tools applicable to the inner query. For example, in one embodiment, the query engine identifies that a custom index exists for a client associated with the query, and applies the custom index to filter results for the query. Thus, the query engine can maintain the context of the query and apply optimizations available for processing the query.

In one embodiment, the query engine provides information about the custom indexes to query optimization processes. The custom index includes a subset of information of a table that includes accounts for multiple different clients. By using the custom index, the query engine can filter the results more efficiently that if solely using a multiple client table that generally has information for multiple clients. While such a table can be searched to generate results for the query, use of custom indexes filters the amount of data needed to be searched, which greatly improves performance.

In one embodiment, a database system allows the use of custom objects, which are objects defined by a client, different from a standard format of objects available in the database system. Parsing of a query with the custom objects can cause a query optimization routine to ignore a custom index or optimizable filter generated by the client for the custom objects, even if the client has also generated the custom index. A query engine can detect custom index filters for clients and make sure an optimization process or routine uses the custom index for the custom objects.

Consider an example of a query to illustrate. Assume there are two custom objects: Mother and Daughter. Each Custom Object has at least two custom Fields, including: First Name and Last Name. Thus, the form of the Custom Objects can be: Mother(firstName, lastName) and Daugher(firstName, lastName). If the relationship between a mother and her daughter is called: "MotherDaughterLookup," the database system can invoke MotherDaughterLookup to identify daughters related to certain mothers, and vice versa.

As a general rule, not all mothers will have daughters, but all daughters will have a mother. Additionally, the system can be set up such that one mother can have many daughters, but a daughter has only one mother, making a 1:N relationship from mother to daughter. Assuming a client associated with the custom objects makes a query to figure out the first names of all mothers and their daughters' last names, the query could be of a form: select motherFirstName_c, (select daughterLastName_c from MotherDaughterLookups_r) from Mother_c. It will be understood that the notation with_c and_r assumes a query going through a SOQL API, which is described in more detail below. Other forms are possible.

If the system wants to limit the daughters retrieved to only those daughters with the last name 'Smith,' an extra filter can be added to change the query as follows: select motherFirstName_c, (select daughterLastName_c from MotherDaughterLookups_r where daughterLastName_c='Smith') from Mother_c. For an Index on daughterLastName, the optimizer may ignore it. If the optimizer ignores the existing custom index, the system will retrieve the information necessary to process the query from a base table available to multiple or all clients of the database system. For example, the system could search a custom foreign key value table to get information to answer the query, which would take much more time than just getting the information from the custom index.

In one embodiment, the query engine is configured to identify the index to a query optimizer process when the optimizer process processes an inner query. Thus, the query engine ensures that the optimization process is aware when a custom index exists for the inner query, to cause the optimization process to use the index. In one embodiment, the query engine evaluates queries for inner queries and determines if there is an associated custom index. If a custom index exists, the query engine processing applies the custom index to the inner query.

In one embodiment, the database system that receives and processes the requests is a multitenant database. The multitenant database provides a "cloud architecture" that allows a user to query for data in a modern database system. As referred to herein, a multitenant database stores data for multiple client organizations, which are each identified by a tenant ID. One or more users can be associated with each tenant ID. The one or more users of each client organization access data identified by the tenant ID associated with the respective client organization. The multitenant database is typically a database stored and hosted remote from the client organization. Typically, the multitenant database is hosted by an entity (e.g., company) separate from the client organization. A multitenant database system (MTS) as described herein can be said to provide on-demand database services. An MTS is typically a hosted system that provides as much database storage and service as required by each tenant.

In an MTS implementation, each tenant ID may have a set of data associations and relationships. Thus, a query on the MTS for one tenant ID may produce different results than the identical query on the MTS for a different tenant ID. In one embodiment, the architecture of each tenant ID develops separately with custom configuration for each tenant, such as custom objects and custom indexes. For example, a UDD (user defined database) may be implemented for each tenant to store relationships and categorization data.

Figure 1:
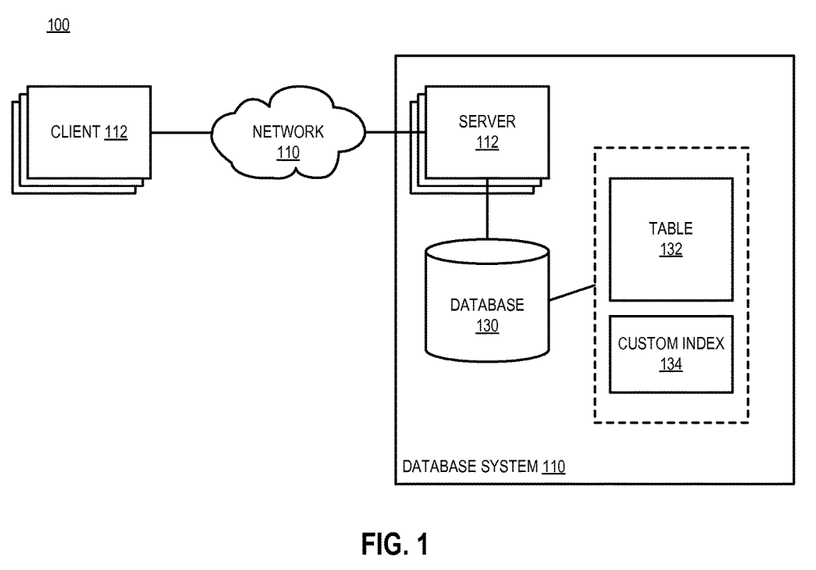
FIG. 1 is a block diagram of an embodiment of a database system that applies a custom index to nested queries.

FIG. 1 is a block diagram of an embodiment of a database system that applies a query optimization to inner queries. System 100 includes client 102 that accesses remote server device 122 that is part of database system 120, over network 110. Client 102 can generate a query having a subquery that requests data from database 130. While database 130 is shown as a separate element of database system 120, it will be understood that in certain implementations, database system 120 and database 130 could be considered to be the same component of system 100. Database 130 includes, among other things, table 132, which represents a base table or master table applicable to multiple or all clients of database 130. Custom index 134 represents a custom index for at least one client of database 130. It will be understood that while a custom index optimization is illustrated, custom index 134 could be replaced by any other database index or other optimization filter applicable for query processing. Thus, a query engine can apply any type of optimization for an inner query that could otherwise be lost for inner query processing in a traditional setting.

When client 102 makes a query on database 130, a primary indicator of efficiency in processing the request is the ability of the database to apply selectivity. Selectivity refers to the ability of the processing resources of the database to apply selections or filters to the request to search for the data in as narrow a field possible. The narrower the search field, the more quickly the system will be able to generate results for the query. To narrow the search field, the processing resources execute a query engine and query optimizer to determine what data of the database should be searched, and what data does not need to be searched. The more selection or selectivity applied, the more rows of data and/or objects are eliminated from the search, and the fewer rows/objects that need to be evaluated. The query engine indicates custom index 134 to the optimizer to cause the optimizer to use the custom index as an access point. An access point is a narrowed field of selection on which a query can be executed. There can be many access points for a query, depending on a number of filters available to apply.

The query optimizer needs to be aware of the access points to use them in performing a search.

Client 102 represents any type of client device that may access a server system, for example, a desktop or laptop computer, a tablet, smartphone, server, or other computing device. Network 110 includes any type of network access that allows client 102 to access database system 120. Network 110 may be or include any one or more networks such as local or wide area networks, wireless or wired, encrypted (e.g., virtual private network (VPN)) or open, on any of a variety of know or proprietary protocols, or other network. Network 110 is understood to include hardware and software components to enable remote connection of one device to another.

In one embodiment, database system 120 is or is part of an on-demand database environment. As an on-demand environment, database system 120 can provide to client 102 the quantity of database resources needed, and when they are needed. As such, database system 120 can appear as a scalable database resource to client 102. In one embodiment, database system 120 has at least one aspect of its configuration that is configurable and scalable for different tenants. It will be understood that fundamentally, data stored is simply data. A database (such as database 130) is a framework of how that data is stored, structured, and interpreted when stored and accessed. Thus, a database may be considered, in one embodiment, as a set of rules and procedures for storing, accessing, and manipulating data.

Figure 2:
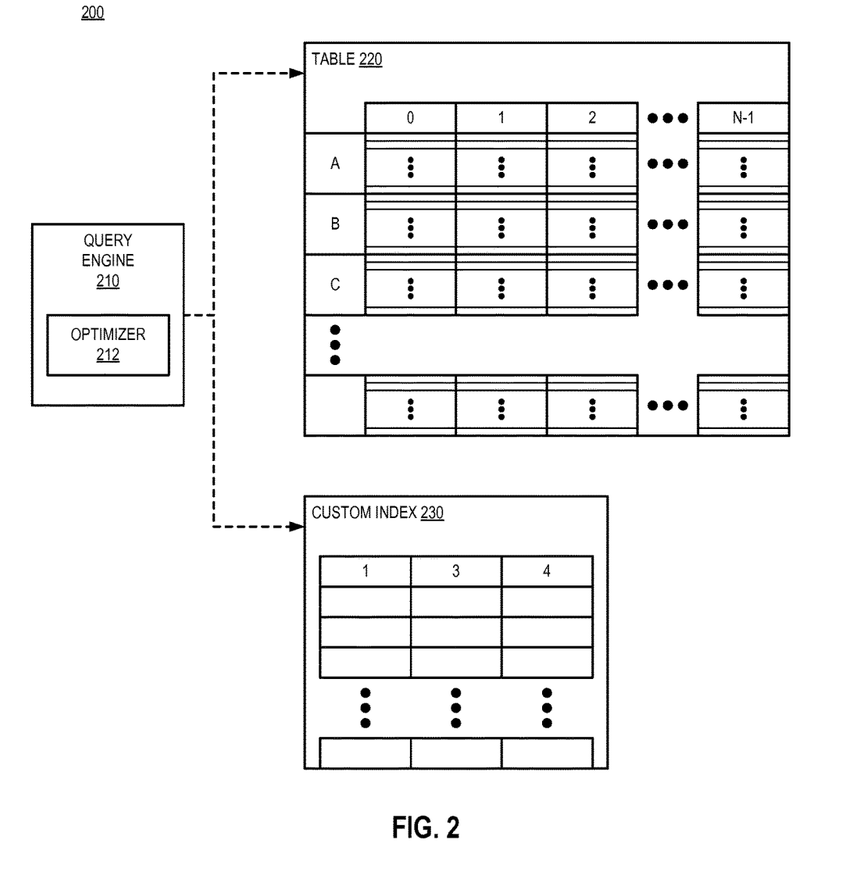
FIG. 2 is a block diagram of an embodiment of a system with a general table having account information for multiple clients, and a custom index having a subset of information.

FIG. 2 is a block diagram of an embodiment of a system with a general table having account information for multiple clients, and a custom index having a subset of information. System 200 illustrates elements of a database system, such as database system 120 of FIG. 1. In one embodiment, system 200 includes query engine 210, which is executed by processing resources or processing hardware of the database system. System 200 includes table 220 and custom index 230, which represents one example of a query optimization tool.

Table 220 represents a base table of system 200. Table 220 is shown having N columns, 0 through N−1, and rows A, B, C, . . . . For purposes of illustration in system 200, assume that each row A, B, C, . . . , represents a separate client of the database system. Thus, for each client, there can be any number of rows of data. An alternative way to visualize table 220 would be for each row of data to identify the client as the first column of data, which could mean that multiple rows would have the same initial column of data identifying a particular client. The different clients do not necessarily have the same number of rows of data as the other clients, but they could. Table 220 includes data for multiple clients. In one embodiment, table 220 includes data for all clients of the database system. Thus, table 220 could be said to store accounts for multiple or all clients of the database system. In one embodiment, table 220 is a complex table, which actually includes multiple different table types, or multiple different tables of different object types, but are indexed and used as a single master table.

Custom index 230 includes a subset of entries that are in table 220. Thus, custom index 230 includes a reduced amount of data. Custom index 230 could be considered to be a filtered subset of data. For example, solely by way of example and not limitation, custom index 230 is illustrated with columns 1, 3, and 4 from table 220. In practice, the columns in custom index 230 are not necessarily duplicates of the data in corresponding columns of table 220. In one embodiment, the columns of custom index 230 include derived data or other data that corresponds to data in table 220, but is not necessarily exactly the same as presented in table 220. In one embodiment, custom index 230 includes custom objects created by the clients of database system 200. Thus, custom index 230 can include a set of custom objects. In one embodiment, custom index 230 includes data specific to only one client or one tenant of the database system. Thus, whereas table 220 includes multiple accounts, custom index 230 can be restricted to entries for a single account or tenant ID.

Query engine 210 processes a user query and provides the query to the database system to generate results. In one embodiment, query engine includes one or more query optimizers 212 to reduce an amount of time and/or processing resources required to process a query. Query engine 210 is typically implemented as logic executed by processing resources of the database system. For example, query engine 210 can be a module that has processing resources, memory, and one or more interfaces allocated to it. The module then executes on the processing resources to provide query processing services. In one embodiment, query engine 210 is part of server of the database system. In one embodiment, query engine 210 is a callable module or process that executes in a process space of a server. In one embodiment, query engine 210 includes a query optimizer 212 for each of multiple databases or data stores that are part of the database system.

In one embodiment, each query optimizer 212 is a process or module separate from query engine 210, such as a process called or invoked by query engine 210. In one embodiment, invoking the query optimizer by query engine 210 includes providing an indication of custom index 230. Thus, query engine 210 can use custom index 230 in addition to and/or instead of table 220.

Figure 3:
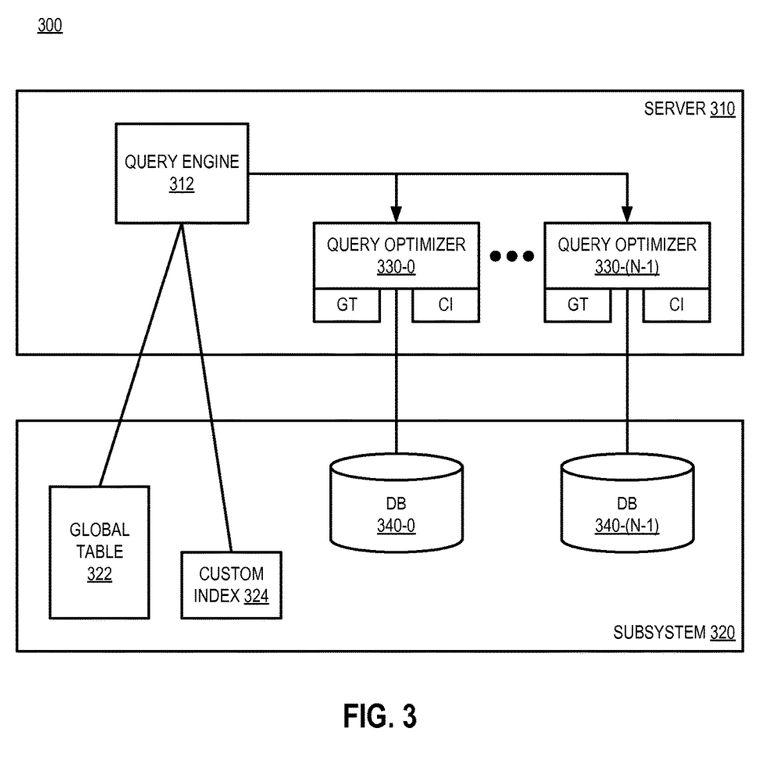
FIG. 3 is a block diagram of an embodiment of a system having a query engine that indicates custom indexes to a query optimizer.

FIG. 3 is a block diagram of an embodiment of a system having a query engine that indicates custom indexes or other query optimizations to a query optimizer. System represents one example of a database system, and can be an example of a database system in accordance with system 200 of FIG. 2 and/or database system 120 of FIG. 1. Database system 300 is shown illustrated as having server components 310 and subsystem 320, which includes one or more databases and associated tables to index the data of the databases. Databases 340-0 through 340-(N−1) illustrate the one or more databases of system 300. Global table 322 represents a table that includes data for multiple clients or multiple accounts. Custom index 324 is an index that includes a subset of information for a given client.

In one embodiment system 300 includes a query optimizer 330 (330-0 through 330-(N−1)) for each database 340 (340-0 through 340-(N−1)). In one embodiment, each query optimizer 330 includes interface GT to interface with global table 322, and interface CI to interface with one or more custom index 324 or other query optimization tools (e.g., database indexes, query filters, or others). While depicted as a server component, it will be understood that query optimizers 330 could be implement in each database 340. Thus, the query optimizer can be middleware or a code module that sits on top of the database itself, and optimizes the query made on the database. In one embodiment, global table 322 references each database 340.

Query engine 312 represents logic that receives and processes a query from a user or client (not specifically shown). In one embodiment, query engine 312 identifies custom index 324 to a query optimizer 330 when it provides a query to the query optimizer. Each query optimizer can be configured to access the global table and/or the custom index to filter and generate results for the query. Query engine 312 allows queries to be processed and directed to a proper database when received from any of the multiple clients of the database system.

Figure 4:
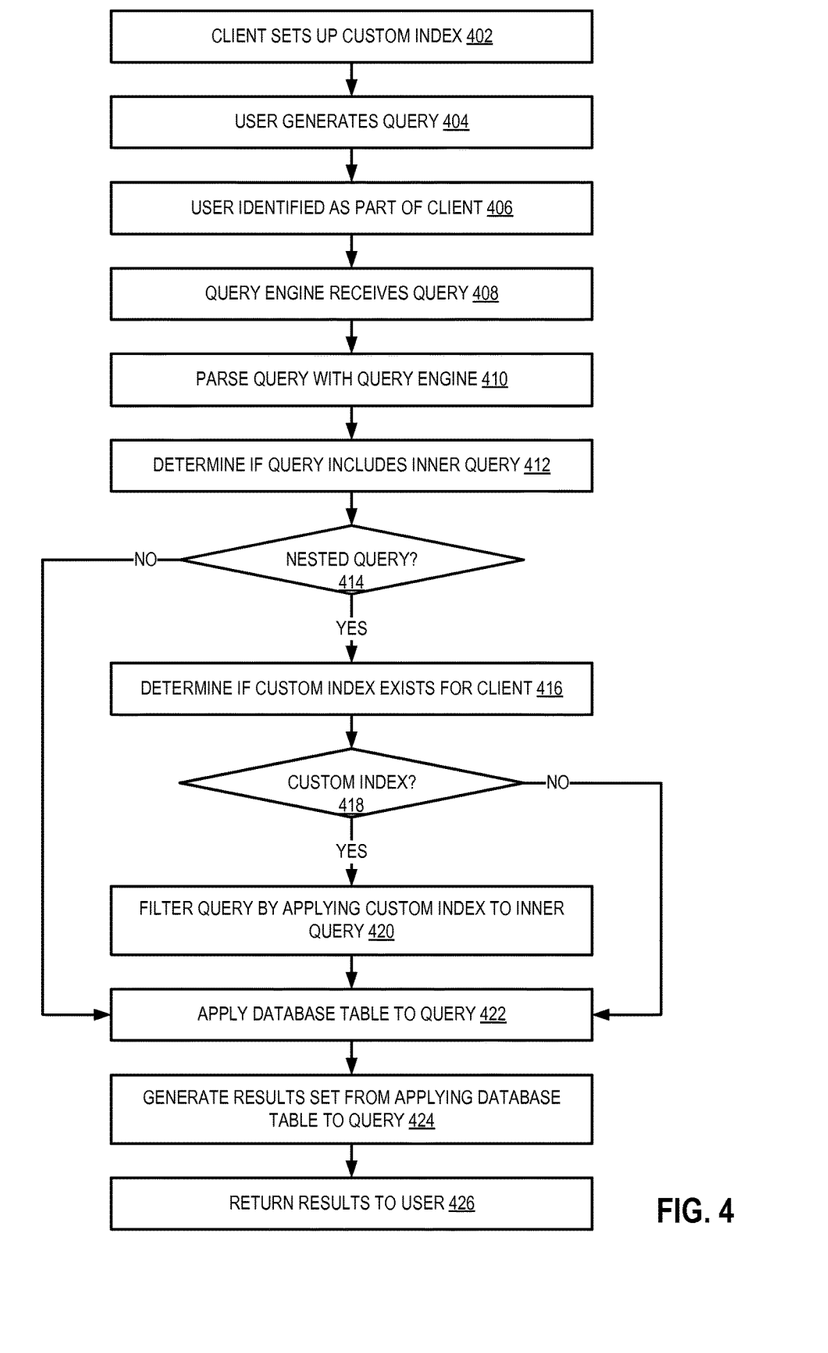
FIG. 4 represents a flow diagram of an embodiment of applying a custom index to a nested query.

FIG. 4 represents a flow diagram of an embodiment of applying a custom index to a nested query. In one embodiment, a client sets up a custom index within an organization of data within a database system, 402. The custom index is a subset of data that can be better suited for processing particular queries than a general table of data within the database system. The custom index can be specific to one client or one tenant of the database system. The custom index can be or include a set of custom objects. In the absence of a custom index, the system would need to search through the general table of data to process queries for the client.

A user associated with the client generates a query, 404. A user interacts with a user interface of a computing device, and executes one or more functions on the computing device that generate a request for data. The user can generate the functions via execution of an application and/or via interacting with a website hosted by the database system. The computing device forwards the query to the database system for processing. The system identifies the user as being associated with a particular client, 406. For example, when the user generates the query, the computing device can send authorization information to the database system. In one embodiment, a user logs into a website hosted by the database system, identifying the user to the database system for subsequent data access requests.

The database system includes multiple servers to receive and process requests. In one embodiment, one or more servers execute a query engine, such as a process or module, which receives and processes the query, 408. In one embodiment, the query engine parses the query, 410, identifying subqueries within the query. Thus, the query engine can determine if there is an inner query within the received query, 412. If there is not an inner query or nested query, 414 NO branch, the query engine can simply apply a general database table to process the query, 422.

If there is an inner query or nested query, 414 YES branch, the query engine can treat the inner query as an independent query. As an independent query, the query engine can apply a full set of optimizations to the processing of the inner query. Query optimizations can include a join of the inner query results to the main query, application of a custom index to the query processing, application of other applicable database indexes to the query processing (rather than processing with a limited set of indexes), application of any other type of database query optimization, or a combination of these. When the query engine determines an inner query exists, the query engine can apply any one or more optimizations available for query processing.

As part of processing the inner query as an independent query, the query engine can determine if any one or more of various optimizations are applicable to the inner query. Thus, in one embodiment, the query engine can determine if a custom index exists for the client, 416. If no custom index exists, 418 NO branch, again, the query engine processes the query with a general database table, 422. If a custom index does exist, 418 YES branch, the query engine makes sure to invoke the custom index in the processing of the query. In one embodiment, the query engine provides an indication of the custom index (e.g., identifying a location, or processing condition, or other way to indicate) to a query optimizer. The query optimizer can then apply the custom index. However the custom index is applied, it can operate to filter the query by applying the custom index to the inner query, reducing the amount of data that needs to be searched to generate results for the query, 420. In one embodiment, the system (e.g., via the query optimizer and/or the query engine) can apply the remainder of the query against the general database table to generate the complete results of the query, 422. In one embodiment, the technical operation of applying the custom index, filtering the results, and combining the filtered results with other results can be considered to be a join operation. The operation can be considered an inner query join. Thus, the query engine can apply one or more custom indexes against one or more inner queries and combine the results of the inner query or queries with the outer query information to generate results for the query, 424. The query engine can then return the results of the query to the user, 426.

Figure 5:
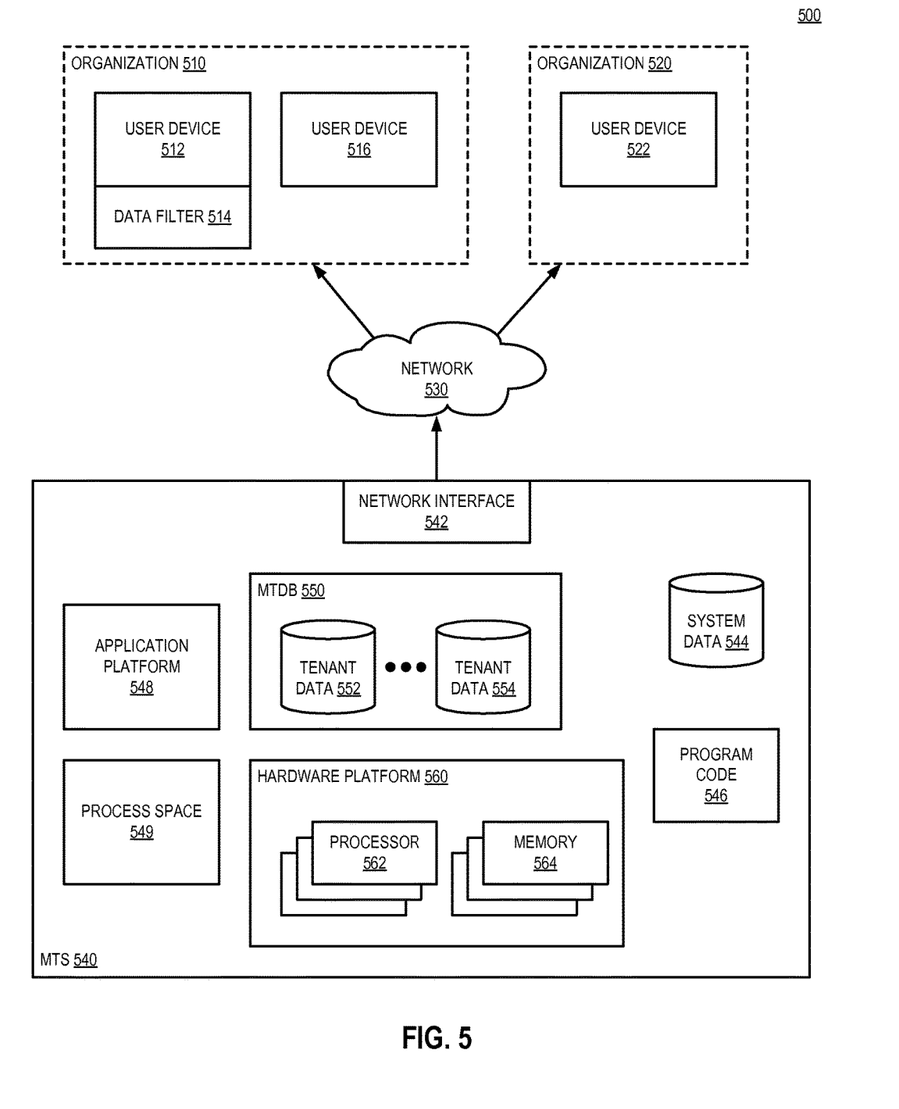
FIG. 5 is a block diagram of an embodiment of an environment for on-demand database services.

FIG. 5 is a block diagram of an embodiment of an environment for on-demand database services in which custom indexes can be applied to process an inner query. Environment 500 includes components related to an on-demand database service. Environment 500 includes multitenant database system (MTS) 540 and one or more organizations 510 and 520, which are tenants of the MTS. Each organization can include one or more users and/or user devices.

MTS 540 provides on-demand database services for environment 500. An on-demand database service, such provided by MTS 540, is a database system that is made available to an outside user as needed by the user (e.g., on the demand of the user). Thus, a user does not necessarily need to be concerned with building and/or maintaining the database system, and rather can simply store and access data as needed from a remotely operated database system.

In one embodiment, MTS 540 stores information from one or more tenants into tables of a common database image or multitenant database (MTDB) 550. Accordingly, MTS 540 provides on-demand database service. A database image may include one or more database objects. A multitenant database stores data for various different tenants or organizations in a single database instance. Resources (such as memory, processing space, processing hardware, and other resources of the database system) are shared or allocated among the different tenants.

Multitenant database 550 includes tenant data 552, . . . , 554. The tenant data may be divided into different storage areas, which can be a physical and/or a logical arrangement of data. In one embodiment, multitenant database 550 is accessed via a relational database management system (RDBMS) or the equivalent, which executes storage and retrieval of information against the database object(s). In one embodiment, multitenant database 550 is accessed via an object-oriented database management system (OODBMS) or the equivalent. In one embodiment, multitenant database 550 is accessed via an object-relational database management system (ORDBMS) or the equivalent. It will be understood that an RDBMS manages data stored in the database based on a relational model, where data and data relationships are stored in tables. An OODBMS includes at least some integration of a database with an object-oriented programming language, and data is stored in the database in the same mode of representation as is provided in the programming language. An ORDBMS implements both a relational model and an object-oriented model, storing data in tables, and allowing representation of data consistent with a programming language.

Application platform 548 represents a framework that allows applications of MTS 540 to execute. Thus, application platform 548 includes the software components (such as an operating system) to allow execution of the applications. Hardware platform 560 provides hardware resources to enable the applications to execute on application platform 548, as well as enabling execution of management or control logic for MTS 540. In one embodiment, application platform 548 of MTS 540 enables creation, managing, and executing one or more applications developed by the provider of the on-demand database service, users accessing the on-demand database service via network 530, or third party application developers accessing the on-demand database service via network 530.

MTS 540 represents any type of system that may provide on-demand database service. In addition to application platform 548 and hardware platform 560, which includes processor resources 562 and memory resources 564, MTS 540 may include other components. MTS 540 includes network interface 542 to enable user devices to access MTS 540 over network 530. In one embodiment, MTS 540 includes system data 544, program code 546, and process space 549. System data 544 represents data specific to the running of MTS 540, rather than being tenant data. It is logically separated from the tenant storage, and may be physically separated (e.g., by designating storage areas or address ranges for system data). Program code 546 represents code to implement various functions of MTS 540, which enable the system to provide on-demand database service. Process space 549 represents a framework for executing MTS processes and tenant-specific processes, such as running applications as part of an application hosting service. It will be understood that MTS 540 may include more or fewer components than what is illustrated.

As mentioned above, environment 500 includes organizations 510 and 520, which represent tenants of MTS 540. Each organization may include one or more individual, and may be an individual or small company, up to a large corporation or organization. Thus, it will be understood that the number of user devices associated with each organization could potentially be hundreds or even thousands. Each organization is assigned a tenant identifier (ID) within MTS 540. Each tenant ID could have certain associated properties for use, depending on how the organization is configured. User device 522 is associated with organization 520, and access MTS 540 under the tenant ID of organization 520. Similarly, user devices 512 and 516 are associated with organization 510, and access MTS 540 under the tenants ID assigned to organization 510.

User devices 512, 516, and 522 may be any machine or system that is used by a user to access a database user system. For example, any of the user devices can be a handheld computing device, a mobile phone, a laptop computer, a work station, and/or a network of computing devices. Each user device can be provided with an on-demand database service from MTS 540 via network 530.

Within an organization, users may be further given access privileges and/or restrictions, as illustrated by data filter 514. As illustrated, user device 516 may access MTS 540 in accordance with whatever access is available to organization 510, while user device 512 has additional restrictions applied by data filter 514. In one embodiment, data filter 514 may additionally or alternatively provide specific user interface features for user 512 in accessing data from MTS 540.

The users of user devices 512, 516, and 522 may differ in their respective capacities, and the capacity of a particular user device might be entirely determined by permissions (permission levels) for the current user. For example, where a salesperson is using a particular user device to interact with MTS 540, that user device has the capacities assigned to that salesperson. However, an administrator using the same user device may have different capacities assigned to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level. Such enforcement could occur based on data filter 514, which can filter per device and/or could filter for the entire organization (e.g., a central filter as opposed to distributed filtering).

Network 530 represents any network or combination of networks. A network is generically an interconnection of devices that communicate with each other. Network 530 can be or include any combination of a LAN (local area network), WAN (wide area network), telephone network, wireless network, point-to-point network, star network, token ring network, hub network, or other appropriate configuration. TCP/IP (Transfer Control Protocol and Internet Protocol) networks are commonly used, such as the global internetwork of networks often referred to as the "Internet." Reference to specific networks in certain examples herein is meant only to provide examples, and is not limiting.

In one embodiment, user devices 512, 516, 522 (and other user devices not shown) communicate with MTS 540 over network 530 using TCP/IP and, at a higher network level, use other common protocols to communicate, such as HTTP (HyperText Transfer Protocol), FTP (File Transfer Protocol), AFS (Andrew File System—a distributed network filesystem using trusted servers), WAP (Wireless Access Protocol). In an example where HTTP is used, user device 512 might include an HTTP client commonly referred to as a "browser" for sending and receiving HTTP messages to and from an HTTP server at MTS 540 (not specifically shown, but which could be executed on hardware platform 560). Such an HTTP server might be implemented as the sole network interface between MTS 540 and network 530, but other techniques might be used as well or instead. In one embodiment, the interface between MTS 540 and network 530 includes load sharing functionality, such as round-robin HTTP request distributors to balance loads and distribute incoming HTTP requests evenly over a plurality of servers. At least as for the users that are accessing that server, each of the plurality of servers has access to data in MTS 540; however, other alternative configurations may be used instead.

In one embodiment, MTS 540 implements a web-based customer relationship management (CRM) system. For example, in one embodiment, MTS 540 includes application servers configured to implement and execute CRM software applications as well as provide related data, code, forms, webpages and other information to and from user devices (e.g., 512, 516, 522) and to store to and retrieve from a database system related data, objects, and webpage content. With a multitenant system, data for multiple tenants may be stored in the same physical database object; however, tenant data is typically arranged so that data of one tenant is kept logically separate from that of other tenants. The logical separation prevents one tenant from having access to another tenant's data. An express sharing of data among tenants is possible, which removes the logical separation. In one embodiment, MTS 540 implements applications other than or in addition to a CRM application. For example, MTS 540 may provide tenant access to multiple hosted (standard and custom) applications, including a CRM application. User (or third party developer) applications, which may or may not include CRM, may be supported by application platform 548, which manages creation, storage of the applications into one or more database objects and executing of the applications in a virtual machine in process space 549 of MTS 540.

In one embodiment, MTS 540 is configured to provide webpages, forms, applications, data and media content to user (client) device to support the access by user devices as tenants of MTS 540. In one embodiment, MTS 540 provides security mechanisms to keep each tenant's data separate unless the data is shared. More than one MTS may be used. If more than one MTS is used, the multiple systems may be located in close proximity to one another (e.g., in a server farm located in a single building or campus), or they may be distributed at locations remote from one another (e.g., one or more servers located in city A and one or more servers located in city B).

As used herein, each MTS could include one or more logically and/or physically connected servers distributed locally or across one or more geographic locations. Additionally, the term "server" refers to a computer system, including processing hardware and process space(s), and an associated storage system and database application (e.g., OODBMS, RDBMS, ORDBMS) as is known in the art. It will be understood that "server system" and "server" are often used interchangeably herein. Similarly, a database object described herein can be implemented as single databases, a distributed database, a collection of distributed databases, a database with redundant online or offline backups or other redundancies, and might include a distributed database or storage network and associated processing intelligence or logic.

A common database table or table system as described with respect to system 500 can be the general or global table referred to earlier. In one embodiment, MTS 540 is a database system that receives and processes queries, including applying custom indexes to inner queries. MTDB 550 of MTS 540 includes one or more tables (not explicitly shown), which can include the global table and one or more custom indexes. When a query is presented to MTS 540, a query engine executing in process space 549 can process the query in accordance with what is described herein, applying the custom indexes as applicable.

Figure 6:
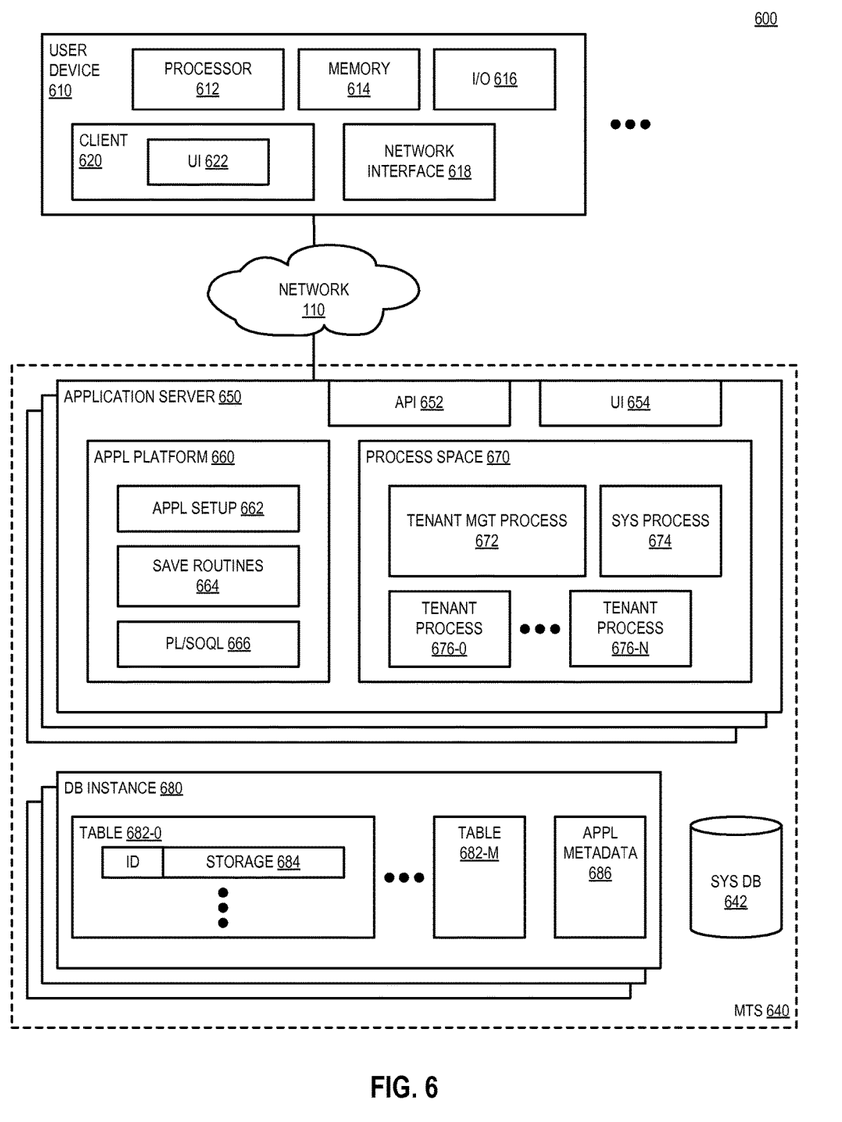
FIG. 6 is a block diagram of an embodiment of an environment for on-demand database services with a multitenant database having multiple data tables.

FIG. 6 is a block diagram of an embodiment of an environment for on-demand database services with a multitenant database having multiple data tables in which custom indexes can be applied to process an inner query. Environment 600 includes components related to providing an on-demand database service, and may be one example of environment 500 of FIG. 5, with additional components shown. Environment 600 includes one or more multitenant database systems (MTS) 640 and one or more tenants of the MTS, as illustrated by user device 610. User device 610 is generally part of an organization that is the tenant, and user device 610 provides a computing device through which access to MTS 640 is available. MTS 640 provides on-demand database services for environment 600.

Environment 600 may include conventional, well-known elements that are explained only briefly here. For example, user device 610 (and any other user devices through which users access MTS 640) could include a desktop personal computer, workstation, laptop, handheld device, cell phone or smart phone, or any wireless access protocol (WAP) enabled device or any other computing device capable of interfacing directly or indirectly to the Internet or other network connection.

User device 610 includes processor 612, which represents one or more processor devices, and may be any combination of one or more processors. Processor 612 provides hardware means to execute programs and applications on user device 610. Memory 614 represents a memory system for user device 610, and may be any combination of one or more memory devices, short term, and/or long term memory. I/O (input/output) 616 represents any type of input and output devices such as keyboards, pointers and controllers, touchscreens, buttons, microphones, or other input mechanisms, and monitors, screens, printers, interfaces to networks, and/or other output devices.

User device 610 includes network interface 618, which represents hardware interconnections and control logic and circuitry to enable user device 610 to connect to network 630. Network interface 618 also has associated drivers and possibly other software components to allow user programs to interface with the interconnection hardware. User device 610 includes client 620, which represents a program that allows a user of user device 610 to access information from network 630, such as accessing MTS 640. UI 622 represents a user interface component of client 620, or a user interface in which information from client 620 is presented on user device 610. Thus, UI 622 may be integrated with client 620, or it may be separate from client 620, but display data related to the execution of client 620. UI 622 is rendered on display or user interface hardware or device, which can be understood to be represented by UI 622.

In one embodiment, user device 610 runs an HTTP client as client 620. An HTTP client may be, for example, a browsing program or a browser, which may include a WAP-enabled browser in the case of a cell phone, PDA or other wireless device. The HTTP client allows a user (e.g., subscriber of MTS 640) of user device 610 to access, process, and view information, pages, and applications available from MTS 640 over network 630, based on permissions and privileges. The user interface device of user device 610 can be used to access data and applications hosted by MTS 640, and to perform searches on stored data, and otherwise allow a user to interact with various GUI (graphical user interface) pages that may be presented to a user.

Similar to what is discussed above with reference to network 530 of environment 500, network 630 represents any network or group of networks over which access can be provided to MTS 640. Network 630 may include switching and/or routing elements, cables, connectors, and other components. In one embodiment, at least part of network 630 is the Internet, referring to a specific global internetwork of networks. However, it should be understood that other networks can be used in addition to or instead of the Internet, such as an intranet, an extranet, a virtual private network (VPN), a non-TCP/IP based network, any LAN or WAN or other network.

In one embodiment, user devices such as user device 610 (which may be client systems) communicate with application server 650 to request and update system-level and tenant-level data from MTS 640 that may require sending one or more queries to tenant data storage in database instance 680 and/or system data in system database 642. In one embodiment, MTS 640 (e.g., application server 650) automatically generates one or more SQL statements (e.g., one or more SQL queries) designed to access the desired information. System data storage in system database 642 may generate query plans to access the requested data from database instance 680.

In one embodiment, MTS 640 includes one or more application servers 650. From one perspective, application server 650 can be considered a network interface of MTS 640 to connect to network 630. Application server 650 exchanges (i.e., receives and/or transmits) data with network 630, such as receiving requests and sending replies or sending data. Application servers 650 may share hardware resources for interfacing with network 630, or they may be assigned separate resources. In one embodiment, one or more of application servers 650 can be implemented as an HTTP application server.

In one embodiment, each application server 650 is configured to handle requests for any user associated with any organization that is a tenant. Thus, a request from user device 610 could be received and processed at any application server 650. There may be advantages to avoiding affinity for a user and/or an organization or tenant to a specific application server 650, such as the ability to add and remove application servers from a server pool at any time for any reason, as well as for workload balancing among the servers. In an implementation where user and/or tenant affinity is used, an application server could not be removed without completing its jobs and/or handing off users to another server.

In one embodiment, an interface system implementing a load balancing function (e.g., an F5 Big-IP load balancer) is communicably coupled between application servers 650 and the user devices to distribute requests to the application servers 650. In one embodiment, the load balancer uses a least connections algorithm to route user requests to the application servers 650. Other examples of load balancing algorithms, such as round robin and observed response time, also can be used. For example, in certain embodiments, three consecutive requests from the same user could hit three different application servers 650, and three requests from different users could hit the same application server 650. In this manner, MTS 640 is multitenant, wherein MTS 640 handles storage of, and access to, different objects, data, and applications across disparate users and organizations. In one embodiment, Each application server 650 includes elements to provide database access service and request processing. Application server 650 includes API (application programming interface) 652 and UI 654. UI 654 represents server-side components that provide user interface elements that are provided to user device 610 for display. API 652 provides an interface for users and/or developers to access resident processes of MTS 640.

In one embodiment, application server 650 includes application (appl) platform 660, which provides a sub-environment on which applications hosted by application server 650 can be executed. Application platform 660 may include an operating system or other control logic, as well as business logic and common routines for use by the applications. As illustrated, application platform 660 includes application setup mechanism 662 that supports creation and management of applications, including configuration, by application developers, which may be saved as metadata into tenant data storage of database (db) instance 680. Save routines 664 represent the mechanisms used to store data in database instance 680, such as storing the application setup metadata. Such applications can be executed by subscriber users, for example, in process space 670.

In one embodiment, invocations to or related to such applications may be coded using PL/SOQL (Procedural Language/Salesforce Object Query Language) that provides a programming language style interface extension to API 652. Thus, PL/SOQL 666 is capable of serving as a procedural extension to an on-demand database centric service API that allows flow control and transaction control to execute on a server in conjunction with database APIs (e.g., SOQL, data manipulation language (DML), or others). PL/SOQL 666 can enable the capability to thread together multiple SOQL/DML statements as a single unit of work on the server. PL/SOQL 666 need not necessarily be considered a general purpose programming language, seeing that it may be implemented as heavily data focused, but is not necessarily implemented that way. In one embodiment, PL/SOQL 666 can be used by developers to interlace with an on-demand database system, in contrast to traditional application developers' conventional tools, such as PL/SQL (Structured Query Language) of ORACLE, Inc. of Redwood Shores, Calif., and others.

In one embodiment, PL/SOQL 666 includes variable and expression syntax, block and conditional syntax, loop syntax, object and array notation, pass by reference, and other syntax known to other programming languages. Thus, full control over syntax and the ability to reference dynamic schema elements is provided with a new language and runtime for database services. Where embedded concepts that interface with on-demand database applications are provided, syntax and semantics that are easy to understand and which encourage efficient use of database APIs may also be employed. In one embodiment, PL/SOQL 666 is implemented as a strong typed language with direct (non-quoted) references to schema objects such as Object and Field names (both standard and custom).

More details about PL/SOQL language embodiments is discussed in commonly owned U.S. Provisional Patent Application 60/828,192 entitled, PROGRAMMING LANGUAGE METHOD AND SYSTEM FOR EXTENDING APIs TO EXECUTE IN CONJUNCTION WITH DATABASE APIs, by Craig Weissman, filed Oct. 4, 2006, now expired, which is incorporated in its entirety.

In one embodiment, invocations to applications may be detected by one or more system processes, which manage retrieving application metadata 686 for the subscriber making the invocation and executing the metadata as an application in a virtual machine. Metadata 686 provides data related to access and/or use of data stored in database instance 680. In one embodiment, metadata is stored in a separate table within database instance 680, and in an alternative embodiment, metadata 686 is stored with other data elements of user storage (such as with user storage 684 of table 682-0.

In one embodiment, application server 650 includes process space 670, which may include tenant process spaces 676-0 through 676-N (for some integer number N of process spaces configured in application server 650), tenant management process space 672 and system process space 674. It will be understood that process space 670 is an abstraction to illustrate the resources allocated for execution of processes (e.g., programs or applications) within application server 650. The skilled reader recognizes that memory and processor and other hardware resources may need to be allocated, as well as software resources to support the execution of a process. The processes may be executed as separate threads, or may share a thread. In one embodiment, the number N of tenant processes is equal to a number of subscriber tenants. In another embodiment, the number N of tenant processes may be higher than the number of subscriber tenants. Tenant management process 672 provides management of the other processes, including determining when certain processes execute. System process 674 executes operations related to functions of MTS 640.

Each application server 650 may be configured to tenant data storage in database instance 680 and the tenant data stored therein, and to system data storage of system database 642 and the system data stored therein to serve requests of user devices. As mentioned above, in one embodiment, tenant data is separated logically, and stored in the same multitenant database. In one embodiment, database instance 680 stores data in tables 682-0 through 682-M, where M is some integer number of tables. In one embodiment, different tables store data of different types. Application metadata 686 may be implemented as a separate table. Alternatively, one of the tables 682-0 through 682-M could be a table that stores varying types of objects, which are defined through metadata stored in the table.

In one embodiment, database instance is further implemented with user storage space distinct (e.g., identifiable) from its associated tenant. Thus, for example, user data may include the tenant ID, as well as an identifier specific to a user. Thus, storage 684 may represent either or both of tenant storage or user storage. For example, a copy of a user's most recently used (MRU) items might be stored to in user storage within database instance 680. Similarly, a copy of MRU items for an entire organization that is a tenant might be stored to a tenant storage area of database instance 680. In one embodiment, the tenant data and the system data (as illustrated by system database 642) are stored in separate databases.

Application servers 650 may be communicably coupled to database systems, e.g., having access to system database 642 and tenant database instance 680, via a different network connection. For example, one application server may be coupled via a network (e.g., the Internet), another application server might be coupled via a direct network link, and another application server might be coupled by yet a different network connection. The application servers may connect to the database systems via TCP/IP or another transport protocol, at least partially depending on the network interconnect used.

Regarding storage in database instance 680, one tenant might be a company that employs a sales force where each salesperson uses MTS 640 to manage their sales process. Thus, a user might maintain contact data, leads data, customer follow-up data, performance data, goals and progress data, and other data, all applicable to that user's personal sales process (e.g., storage 684, which may be tenant storage). Thus, all of the data and the applications to access, view, modify, report, transmit, calculate, or perform other operations can be maintained and accessed via a user device having nothing more than network access. In an example of an MTS arrangement, the user can manage his or her sales efforts and cycles from any of many different user devices. For example, if a salesperson is visiting a customer and the customer has a lobby with Internet access, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by MTS 640 that are allocated at the tenant level while other data structures might be managed at the user level. Because MTS 640 may support multiple tenants including possible competitors, MTS 640 should have security protocols that keep data, applications, and application use separate. Additionally, because many tenants may opt for access to an MTS rather than maintain their own system, redundancy, up-time, and backup are additional functions that may be implemented in MTS 640. In addition to user-specific data and tenant specific data, MTS 640 may also maintain system level data usable by multiple tenants or other data. Such system level data might include industry reports, news, postings, and the like that are sharable among tenants.

In one embodiment, each database instance 680 can be viewed as a collection of objects, such as a set of logical tables, containing data fitted into predefined categories. A "table" is one representation of a data object, and may be used herein to simplify the conceptual description of objects and custom objects according to what is described herein. It should be understood that "table" and "object type" may be used interchangeably herein. Each table generally contains one or more data categories logically arranged as columns or fields in a viewable schema. Each row or record of a table contains an instance of data for each category defined by the fields.

For example, a CRM database may include a table that describes a customer with fields for basic contact information such as name, address, phone number, fax number, or other information. Another table might describe a purchase order, including fields for information such as customer, product, sale price, date, or other fields. In one embodiment, a multitenant database has standard entity tables for use by all tenants. For CRM database applications, such standard entities might include tables for Account, Contact, Lead, and Opportunity data, each containing pre-defined fields. Thus, tables 682-0 through 682-M may include standard, defined tables.

In one embodiment, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", teaches systems and methods for creating custom objects as well as customizing standard objects in a multitenant database system. In one embodiment, for example, all custom entity data rows are stored in a single multitenant physical table, which may contain multiple logical tables per organization. It is transparent to customers that their multiple "tables" are in fact stored in one large table or that their data may be stored in the same table as the data of other customers.

In one embodiment, MTS 640 is a parent domain for a client application executing within a browser on user device 610. The browser provides information from MTS 640, and includes a frame which executes the client application from a different domain. One or more processes executing in MTS 640 can receive asynchronous cross domain requests made via an in-browser proxy in the browser on the user device.

In one embodiment, MTS 640 is a database system that receives and processes queries, including applying custom indexes to inner queries. DB instance 680 includes one or more tables 682, which can include the global table and one or more custom indexes. When a query is presented to MTS 640 from user device 610, a query engine executing in process space 670 can process the query in accordance with what is described herein, applying the custom indexes as applicable.

Flow diagrams as illustrated herein provide examples of sequences of various process actions. Although shown in a particular sequence or order, unless otherwise specified, the order of the actions can be modified. Thus, the illustrated implementations should be understood only as an example, and the process can be performed in a different order, and some actions may be performed in parallel. Additionally, one or more actions can be omitted in various embodiments; thus, not all actions are required in every implementation. Other process flows are possible.

Various operations or functions are described herein, which may be described or defined as software code, instructions, configuration, and/or data. The content may be directly executable ("object" or "executable" form), source code, or difference code ("delta" or "patch" code). The software content of the embodiments described herein may be provided via an article of manufacture with the content stored thereon, or via a method of operating a communications interface to send data via the communications interface. A machine readable medium or computer readable medium may cause a machine to perform the functions or operations described, and includes any mechanism that provides (i.e., stores and/or transmits) information in a form accessible by a machine (e.g., computing device, electronic system, or other device), such as via recordable/non-recordable storage media (e.g., read only memory (ROM), random access memory (RAM), magnetic disk storage media, optical storage media, flash memory devices, or other storage media) or via transmission media (e.g., optical, digital, electrical, acoustic signals or other propagated signal). A communication interface includes any mechanism that interfaces to any of a hardwired, wireless, optical, or other medium to communicate to another device, such as a memory bus interface, a processor bus interface, an Internet connection, a disk controller. The communication interface can be configured by providing configuration parameters and/or sending signals to prepare the communication interface to provide a data signal describing the software content.

Various components described herein may be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications may be made to the disclosed embodiments and implementations without departing from their scope. Therefore, the illustrations and examples herein should be construed in an illustrative, and not a restrictive sense.

What is claimed is:

1. A method for query optimization in an on demand database system in which a single table within a database of the database system stores account information for multiple different clients, the multiple different clients having corresponding custom database objects, the method comprising:

receiving, an original query having an outer query and one or more inner queries at a query engine of the on demand database system having at least one hardware processor coupled with at least one storage device storing the database, the original query associated with a client of the on demand database system and to be performed using data in the database belonging to the client including at least data stored on a custom database object corresponding to the client;

identifying, with the query engine, one or more inner queries nested within the original query;

identifying, with the query engine, a client-specific custom index for the client to which the original query corresponds, the client-specific custom index stored in the database, wherein the client-specific custom index includes a subset of entries specific to the client;

applying, with the query engine, the client-specific custom index to each of the one or more inner queries treating each or the one or more inner queries as independent queries;

performing, with the query engine, the optimized one or more inner queries on data stored in the single table prior to generating results for the original query; and joining, with the query engine, results from the optimized one or more inner queries with results for the outer query to generate a result for the original query.

2. The method of claim 1, wherein the single table stores accounts for all clients of the on demand database system.

3. The method of claim 1, wherein the client-specific custom index includes a set of custom objects.

4. The method of claim 1, wherein determining the query has the nested query comprises parsing the query with the query engine into one or more nested queries with results to be combined as a result to the original query.

5. The method of claim 1, wherein the on demand database system includes multiple databases referenced by the single table, and wherein each of the multiple databases includes a query optimizer specific to queries for the respective database.

6. The method of claim 5, wherein applying the client-specific custom index further comprises the query engine identifying the client-specific custom index to the query optimizers.

7. An article of manufacture comprising a non-transitory computer readable storage medium having content stored thereon instructions, which when executed by one or more processors, for query optimization in an on demand database system in which a single table within a database of the database system stores account information for multiple different clients and the multiple different clients, the multiple different clients having corresponding custom database objects, the instructions to cause a machine to perform operations configurable to:

receive, an original query having an outer query and one or more inner queries at a query engine of the on demand database system having at least one hardware processor coupled with at least one storage device storing the database, the original query associated with a client of the on demand database system and to be performed using data in the database belonging to the client including at least data stored on a custom database object corresponding to the client;

identify, with the query engine, one or more inner queries nested within the original query;

identify, with the query engine, a client-specific custom index for the client to which the original query corresponds, the client-specific custom index stored in the database, wherein the client-specific custom index includes a subset of entries specific to the client;

apply, with the query engine, the client-specific custom index to each of the one or more inner queries treating each or the one or more inner queries as independent queries;

perform, with the query engine, the optimized one or more inner queries on data stored in the single table prior to generating results for the original query; and join, with the query engine, results from the optimized one or more inner queries with results for the outer query to generate a result for the original query.

8. The article of manufacture of claim 7, wherein the single table stores accounts for all clients of the on demand database system.

9. The article of manufacture of claim 7, wherein the client-specific custom index includes a set of custom objects.

10. The article of manufacture of claim 7, wherein determining the query has the nested query comprises parsing the query with the query engine into one or more nested queries with results to be combined as a result to the original query.

11. The article of manufacture of claim 7, wherein the on demand database system includes multiple databases referenced by the single table, and wherein each of the multiple databases includes a query optimizer specific to queries for the respective database.

12. The article of manufacture of claim 11, wherein the content for applying the client-specific custom index further comprises content for the query engine identifying the client-specific custom index to the query optimizers.

13. A computer system comprising:
network interface hardware to connect to a multitenant database system (MTS), wherein the MTS stores data for multiple client organizations each identified by a tenant identifier (ID) and one or more users are associated with the tenant ID, wherein the one or more users of each client organization access data identified by the tenant ID associated with the respective client organization, and wherein the multitenant database is hosted by an entity separate from the client organization; and
a processor device to execute a query engine for the MTS, configurable to
receive, an original query having an outer query and one or more inner queries at a query engine of the on demand database system having at least one hardware processor coupled with at least one storage device storing the database, the original query associated with a client of the on demand database system and to be performed using data in the database belonging to the client including at least data stored on a custom database object corresponding to the client;
identify, with the query engine, one or more inner queries nested within the original query;
identify, with the query engine, a client-specific custom index for the client to which the original query corresponds, the client-specific custom index stored in the database, wherein the client-specific custom index includes a subset of entries specific to the client;
apply, with the query engine, the client-specific custom index to each of the one or more inner queries treating each or the one or more inner queries as independent queries;
perform, with the query engine, the optimized one or more inner queries on data stored in the single table prior to generating results for the original query; and
join, with the query engine, results from the optimized one or more inner queries with results for the outer query to generate a result for the original query.

14. The computer system of claim 13, wherein the single table stores accounts for all clients of the on demand database system.

15. The computer system of claim 13, wherein the query engine is to determine the query has the inner query by parsing the query with the query engine into one or more inner queries with results to be combined as a result to the query.

16. The computer system of claim 13, wherein the MTS includes multiple databases referenced by the single table, and wherein each of the multiple databases includes a query optimizer specific to queries for the respective database.

17. The computer system of claim 16, wherein the query engine is to apply the client-specific custom index by identifying the client-specific custom index to the query optimizers.

* * * * *